(12) United States Patent
Schumann

(10) Patent No.: US 6,205,521 B1
(45) Date of Patent: Mar. 20, 2001

(54) INCLUSION MAP FOR ACCELERATED CACHE FLUSH

(75) Inventor: Reinhard C. Schumann, Stow, MA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 08/963,661

(22) Filed: Nov. 3, 1997

(51) Int. Cl.[7] .................................................. G06F 12/00
(52) U.S. Cl. ......................... 711/144; 711/133; 711/143; 711/135; 711/5
(58) Field of Search ..................................... 711/141, 144, 711/145, 205, 207, 210, 3, 135, 133, 143, 5

(56) References Cited

U.S. PATENT DOCUMENTS

| | | | |
|---|---|---|---|
| 5,448,719 | 9/1995 | Schultz et al. ................... | 395/182.03 |
| 5,488,709 | * 1/1996 | Chan ..................................... | 711/118 |
| 5,584,013 | * 12/1996 | Cheong et al. ....................... | 711/122 |
| 5,668,968 | * 9/1997 | Wu .......................................... | 711/3 |
| 5,692,150 | * 11/1997 | Moriyama et al. ................... | 711/135 |
| 5,778,430 | * 7/1998 | Ish et al. ............................... | 711/133 |
| 5,778,431 | * 7/1998 | Rahman et al. ...................... | 711/135 |
| 5,845,325 | * 12/1998 | Loo et al. ............................. | 711/135 |

* cited by examiner

Primary Examiner—Do Hyun Yoo
Assistant Examiner—Mehdi Namazi
(74) Attorney, Agent, or Firm—Hamilton, Brook, Smith & Reynolds, P.C.

(57) ABSTRACT

A cache memory controller in which data processing systems having active power management may efficiently flush a cache during a shut down operation. A cache map divides the cache into a number of blocks and an inclusion bit is stored for each block. The block inclusion bit is set whenever a cache line in the block is fetched. As a result, when it is time to flush the cache during a time critical power management operation, the software need only flush those sections of the cache where the block inclusion bit has been set.

8 Claims, 4 Drawing Sheets

INCLUSION MAP FOR ACCELERATED CACHE FLUSH

FIELD OF THE INVENTION

The present invention relates generally to data processing systems and in particular to a cache map that accelerates cache memory operations.

BACKGROUND OF THE INVENTION

Cache memories are small, relatively high speed memories used in most modern data processing systems to temporarily replicate portions of main memory which are currently in use by a central processing unit (CPU). By segmenting memory into higher speed cache and lower speed main memory, a substantial increase in software execution rate can be experienced since most programs access the same portions of memory over and over again. Therefore, by keeping as much of the actively needed data as possible in the cache, the CPU avoids the need to access the slower main memory.

Cache memories operate by mirroring the contents of main memory in a way which is typically transparent to the CPU. For example, each memory address generated by the CPU is first passed to a cache controller. The cache controller keeps track of which portions of main memory are currently assigned to the cache. On each memory access, if the cache is currently assigned to hold the contents of the requested address, a "cache hit" occurs and the cache is enabled to complete the access, whether it be a write access or a read access. If this is not the case, a "cache miss" has occurred, and the main memory is enabled for access. When a miss occurs, the cache typically assigns the requested miss address to itself, fetches the data from memory, and if necessary, displaces the contents of a corresponding cache location.

Also common in data processing systems such as personal computers are power management features whereby the CPU may be shut down during periods of non-use in order to conserve energy. In order for such features to avoid corrupting data in the main memory, power management activities must be coordinated with so-called "cache flushing." Cache flushing is an operation by which the contents of the cache are copied back to main memory, and must typically be performed prior to a power down sequence in order to avoid losing data. It is therefore common to include a so-called "dirty" bit with each cache location, indicating whether the data for the cache location is different from the corresponding data in the main memory. Thus, during the flushing operation, the system walks through the list of dirty bits for each cache location to determine whether the data must be written back to main memory prior to continuing with the power management sequence.

While the need to check each cache location for coherency with respect to the main memory was not a particular problem when cache memories were of a fairly small size, it is now common for cache memories to include many megabytes. Therefore, the time for a cache flushing operation is no longer insignificant; indeed, it is quite possible that the cache flushing operation itself may consume a significant portion of the total power dissipation of the system. As a result, the system may consume significantly more power than otherwise necessary during idle periods. The user may also end up having to wait for the system to complete a cache flushing operation, which tends to minimize any visible benefit from enabling power management features in the first place, especially when the processor is only lightly loaded.

SUMMARY OF THE INVENTION

In brief summary, a cache memory in accordance with the present invention is arranged in blocks, with each block containing a number of cache line locations. The system also contains a cache flush map having an inclusion map that includes a bit for each cache block. The inclusion bits act as a summary of the state of individual cache dirty bits for the cache lines in the associated block; that is, the inclusion bit is set if one or more of the dirty bits are set for those cache lines.

Whenever data is written to any of the cache lines in a given block, the inclusion bit associated with that block is set. The inclusion bit is cleared when the associated block is written back to main memory, when the associated block is otherwise written back to main memory, or when the main memory and cache otherwise become coherent.

As a result, the state of the inclusion bit map always indicates which blocks within the cache might contain new data. Therefore, when it becomes time to flush the cache, only those blocks whose corresponding inclusion bit is set need to be checked.

The invention is also a process for flushing a cache as part of a power management process in which a block inclusion bit is set according to the states of cache line valid bits associated with each of several cache lines in a cache block. During a cache flushing operation executed as part of a power management cycle, the state of each inclusion bit is read. If the inclusion bit is set, then the cache lines in the associated block are checked to see whether they need to be written back to main memory. If, however, the associated block inclusion bit is not set, then no flushing of the associated block is necessary.

The invention therefore provides substantial benefits especially where only small portions of a cache memory are changed between successive power management operations.

BRIEF DESCRIPTION OF THE DRAWINGS

This invention is pointed out with particularity in the appended claims. An understanding of how the above and further advantages of the invention are accomplished may be had by referring to the following description in conjunction with the accompanying drawings, in which:

DETAILED DESCRIPTION OF AN ILLUSTRATIVE EMBODIMENT

Figure 1:
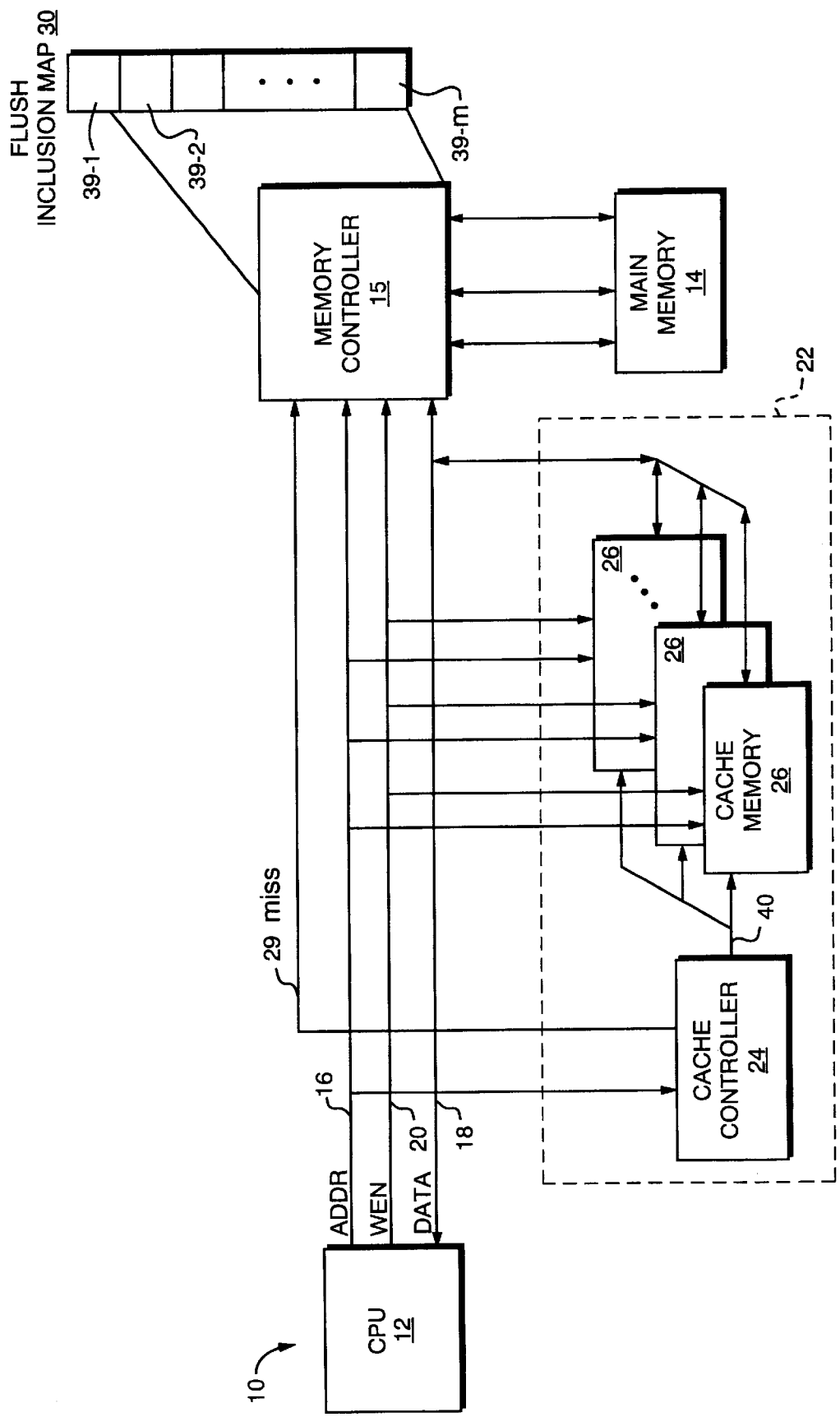
FIG. 1 is a block diagram of a data processing system, including a cache memory and controller in accordance with the invention.

Referring now in particular to FIG. 1, there is shown a data processing system 10, including a central processing unit (CPU) 12, a main memory 14, a memory controller 15 and a cache subsystem 22, consisting of a cache controller 24 and multiple cache memory components 26. Various system components are interconnected by an address bus 16, a data bus 18 and a write enable signal 20.

The CPU 12 may typically be a microprocessor such as the Alpha series microprocessors sold by Digital Equipment Corporation of Maynard, Massachusetts. The main memory 14 is constructed with appropriate, cost effective bulk storage devices such as dynamic random access memory (DRAM) integrated circuits. The CPU 12 sends memory address signals over the address bus (ADDR) 16 to perform memory accesses which include both reading data from or writing data to the main memory 14 over the data bus (DATA)18. The write enable signal (WEN) 20 controls whether or not each memory access results in data being read or written.

In general, the cache 26 is composed of fast access time storage devices such as static random access memory (SRAM) integrated circuits. The cache 26 mirrors the contents of the main memory 14 to speed up the overall access time of the system 10. In particular, when the CPU 12 provides an input main memory address over the bus 16, the cache subsystem 22, specifically the cache controller 24, first checks to see if the memory location corresponding to the input address has been assigned to the cache 26. If so, the cache controller 24 enables an appropriate one or more of the cache memories 26 so that the data access can take place. If, however, the cache controller 24 does not recognize the address as being assigned to the cache memories 26, then a cache miss signal 29 is asserted and the memory controller 15 enables the main memory 14 to perform the desired memory access.

Accesses to and from the cache 26 typically occur in groups of bytes known as a cache line. The size of a cache line depends upon the number of bits that can be accessed in parallel in a single cache memory operation. In the example being discussed herein, the cache memories 26 contain cache lines of sixty-four (64) bytes each. A total number of locations in the cache 26 described herein is two megabytes (2 MB).

The cache 26 is further divided into 32 sub-sections, or blocks, such that each block contains 64 kilobytes (KB) of memory, or 1024 cache lines. The configuration of the cache is described in greater detail in connection with FIG. 2 below.

The cache controller 24 also executes another critical operation with respect to maintaining the integrity of the main memory 14. In particular, during write accesses by the CPU 12 to the cache 26, locations in the cache 26 are eventually rewritten such that data in the corresponding locations in main memory 14 no longer correspond to the data in the cache. In such an instance, the cache line contains the correct data and not the corresponding main memory locations. The cache locations for which this occurs are indicated by setting a dirty bit for the associated cache line each time the cache line is written with new data.

During normal operation of the CPU 12, this is not of particular concern as long as the contents of the cache 26 remain intact. However, each time that the CPU 12 requests access to data which is not in the cache 26, new data must be read from main memory and stored into the cache 26. Eventually, the contents of some other location in the cache 26 must be displaced in order to accommodate the new data which is now desired to be cached. In this instance, a so-called victim transaction is executed, whereby if the dirty bit has been set in the associated cache line, the cache line data to be displaced is first replaced to main memory 14 before it is overwritten.

Figure 2:
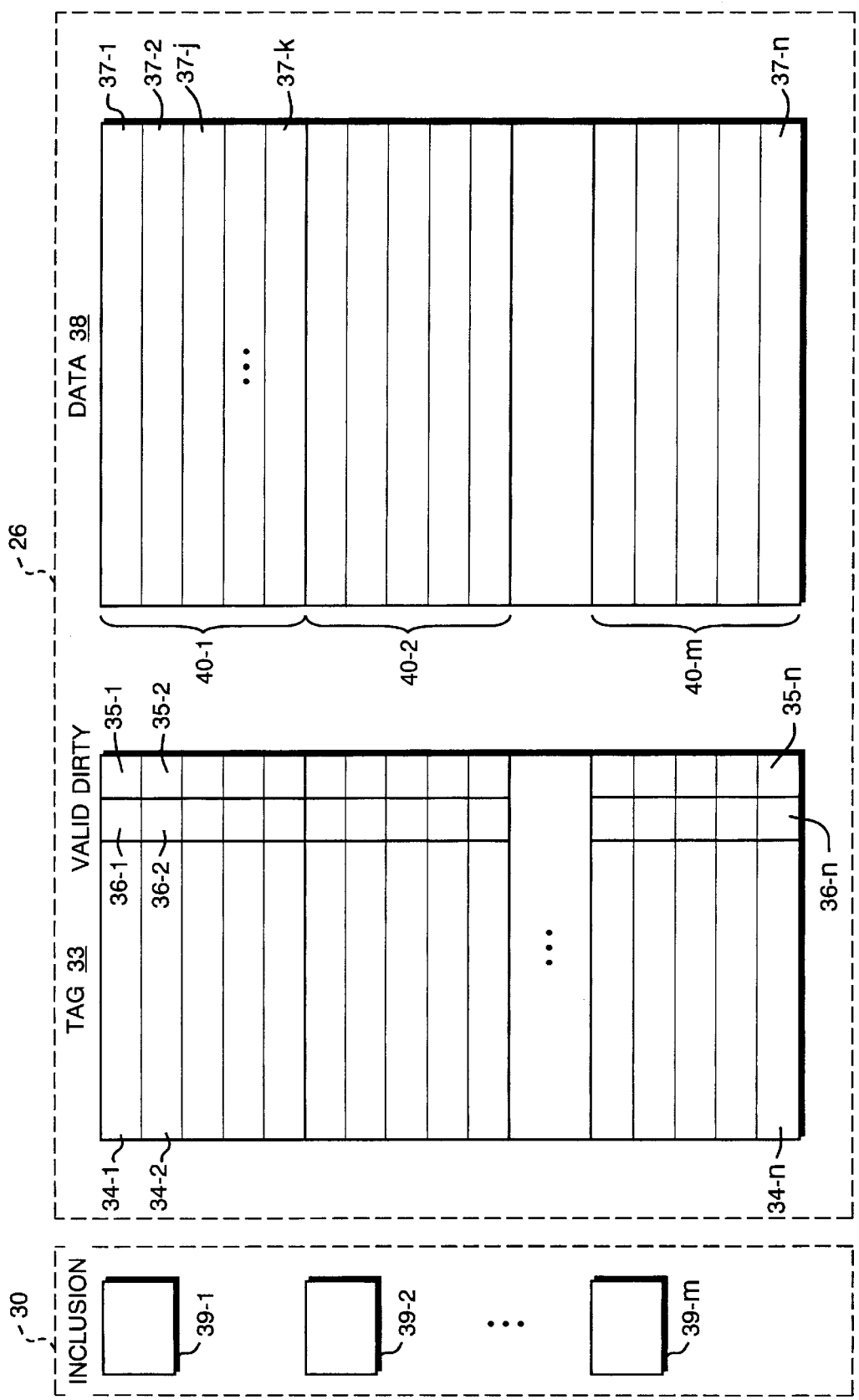
FIG. 2 is a more detailed diagram of the cache memory showing the inclusion bit associated with each block of FIG. 1 cache lines.

A more detailed view of a typical write-through cache memory 26 is shown in FIG. 2. The cache memory 26 includes a tag array 33 and a data array 38. As is well known in the art, the tag array 33 keeps track of which locations in main memory 14 have been assigned to the cache 26. This is done by storing a main memory address in a location 34 of the tag array 33 corresponding to a cache line in the data array 38 which holds the data for the main memory address.

The tag array 33 therefore consists of a number of locations 34-1, 34-2, . . . , 34-n in which are stored main memory addresses.

The data array 38 consists of a like number of locations or cache lines 37-1, 37-2, , 37-n. In the illustrated cache 26, each cache line 37 in the data array 38 consists of sixty-four (64) bytes. As described previously, In the present embodiment designated herein, k equals 1024. The data array is also divided into m blocks 40-1, 40-2, . . . , 40-m whereby each block 40 consists of k cache lines 37.

Each cache line 37 has an associated valid bit 36-1, 36-2, . . . , 36-n typically stored as part of the tag array 33. A valid bit 36 indicates whether a particular cache line 37 associated with it has been overwritten since last being read from the main memory 14. For example, the valid bit 36 is set when data is first read from the main memory 14 and written into the associated cache line 37. In this manner, when it becomes time to overwrite data in the cache, the valid bits 36 serve to inform the system 10 which cache lines 37 need to be rewritten back to the main memory 14 in a victim transaction, i.e., which locations in the cache contain the valid copies of the data.

The tag array 33 also includes a dirty bit 35-1, 35-2, . . . , 35-n for each corresponding cache line 37. A dirty bit 35 is set to indicate that the associated cache line 37 contains the correct copy of the data and that the associated location in the main memory 14 may have incorrect data. This may typically occur when the cache 26 is enabled for write access; e.g., the CPU 12 writes the cache directly and the correct data is only contained in the cache 26.

As a result, a dirty bit 35 is typically not set in normal operation unless the corresponding valid bit 36 is also set. In other words, the only locations which become "dirty" in the main memory 14 are those for which the cache 26 contains valid data. The dirty bit 35 is set whenever the CPU 12 overwrites the data in a cache line 37, and is cleared whenever data is copied back from the cache line 37 to main memory 14.

Of concern to the present invention is a power management operation whereby the contents of the cache 26 must be written back to main memory, or "flushed," prior to shutting down the cache 26, which is a volatile memory.

In accordance with the invention, a flush inclusion map 30 consists of a number of block inclusion bits 39-1, 39-2, . . . , 39-m. The flush inclusion map 30 is typically implemented in the memory controller 15. There is a block inclusion bit associated with each block 40 of the data array 38.

An inclusion bit 39-1, 39-2, . . . , 39-m is maintained for each block 40-1, 40-2, . . . , 40-m as a "map" of the valid bits 36 in the respective block 40. For example, an inclusion bit 39-1 associated with a first block 40-1 in the cache 26 is set whenever any one of the valid bits 36-1, . . . 36-k in the associated block 40-1 is set. The inclusion bit 39-1 is cleared whenever the cache 26 is flushed.

The valid bit 36 associated with each cache line 37 is also cleared when the cache 26 is flushed, and is set whenever data is first read from the main memory and stored in the associated cache line 37 as already discussed.

As a result, if a given inclusion bit 39-i is set, there is a possibility that the associated block 40-i contains dirty locations, as indicated by the state of the individual dirty bits 35 in the associated block. If the inclusion bit 39-i is clear, there are no dirty cache entries, and the associated block 40-i can be skipped during the cache flush operation. The inclusion map 30 therefore reflects the state of the valid bits 36 on a block by block basis.

Figure 3A:
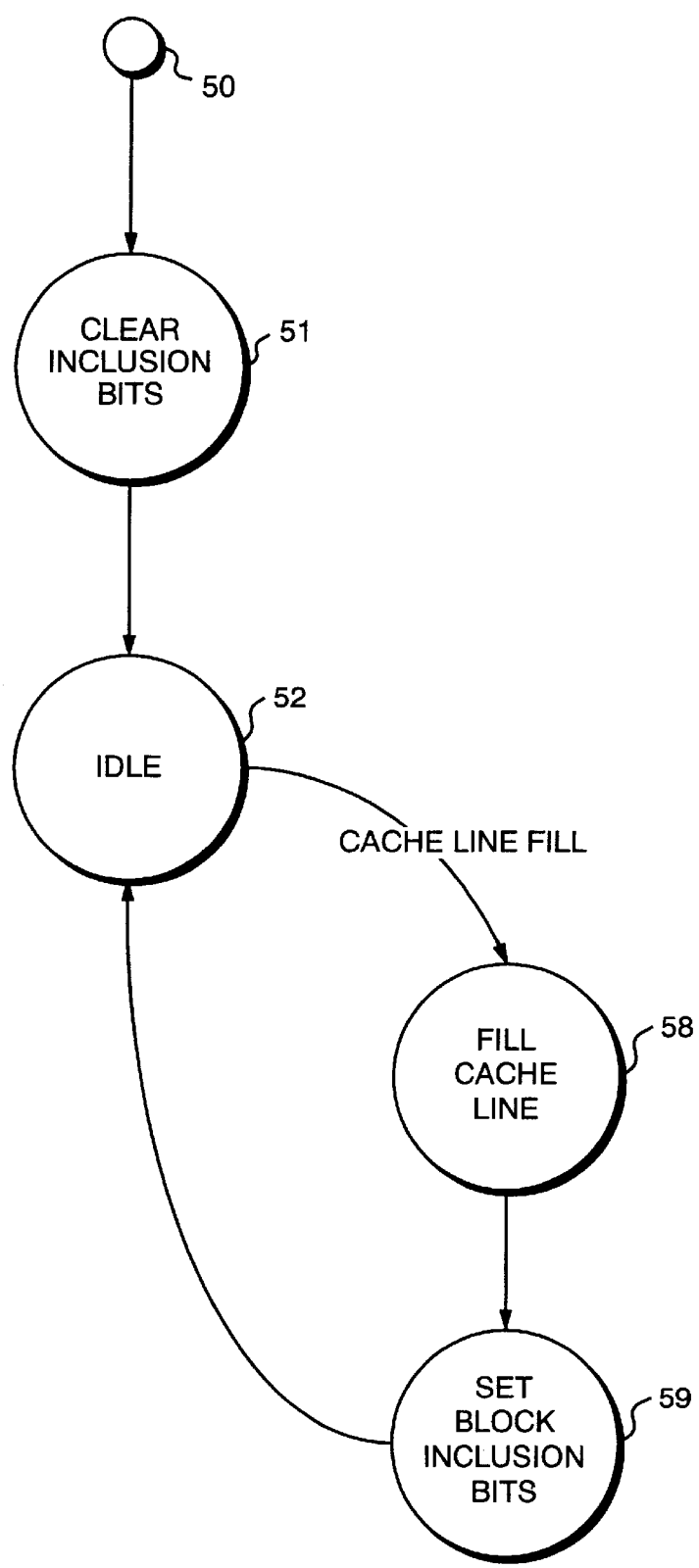
FIGS. 3A and 3B are state diagrams of the operations performed by the controller of FIG. 1.
Figure 3B:
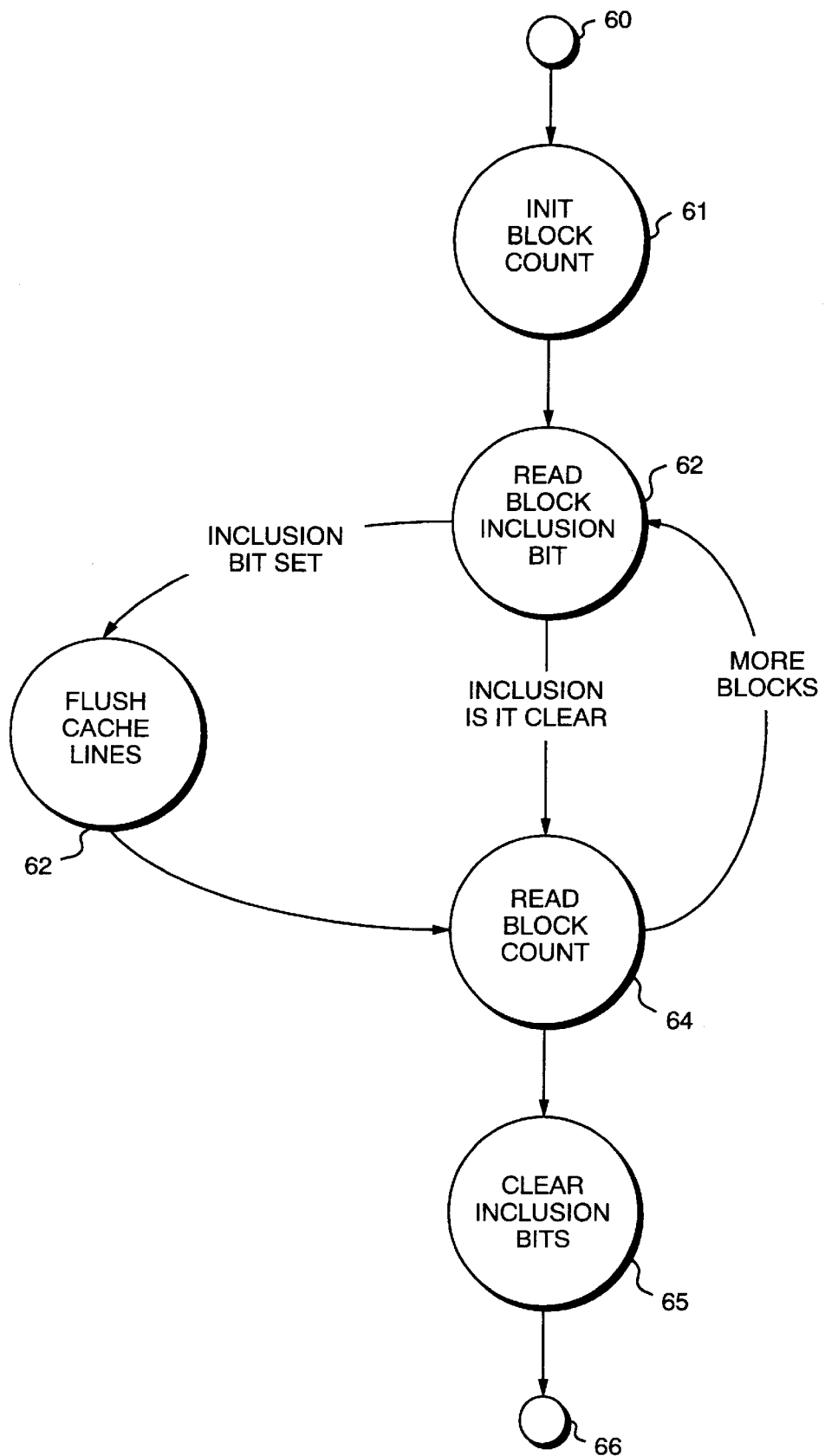

FIGS. 3A and 3B are state diagrams for logic or a process that may be implemented in the cache controller 24 to maintain the inclusion bits 39 as required. FIG. 3A illustrates a set of states executed by a hardware cache controller 24 for cache memory operations during normal operation of the CPU, whereas FIG. 3B illustrates a number of states of the memory controller 15 or CPU 12 software during a power-down sequence. It should be noted that the processes of FIGS. 3A and 3B can be executed by various combinations of hardware, firmware, or software.

Referring first to FIG. 3A, during normal operation of the CPU 12 (e.g., not while any power management function is being executed), the cache controller 24 enters a state 51 in which the inclusion bits 39 for all of the blocks 40 in the cache 26 are set to an initial clear state. The controller 24 then enters an idle state 52 from which a number of other memory operations may take place such as read access operations or write access operations.

In the case of a cache line write operation, the device enters a state 58 wherein a particular cache line 37, as indicated by address inputs, is filled with the appropriate data. Following this write cache operation, a set block inclusion state 59 is entered whereby the block inclusion bit 39 associated with the cache block 40 in which the cache line 37 resides is set. The cache controller 24 then returns to the idle state 52.

FIG. 3B shows a set of states entered during a power management operation requiring a cache flush. This may occur typically during a power-down operation. From an initial state 60, a block counter is set to an initial value such as 0 in state 61. In state 62, a block inclusion bit for the next block is examined. For example, on the first iteration of the states in FIG. 3B, an inclusion bit 39-1 is read. If the inclusion bit is set, then a state 62 is entered in which the cache lines in block 40-1 are flushed by checking the associated dirty bits, 35-1, 35-2, . . . , 35-k, to determine which of the cache lines 37-1, 37-2, . . . , 37-k need to be written back to main memory 14. The block count is then read in state 64 and if there are additional blocks 40 in the cache 26, the read inclusion state 62 is again entered.

However, if in state 62, the associated inclusion bit is already clear, then the cache flush operation in state 62 need not be executed and state 64 may be entered directly.

Once in state 64, if all of the blocks 40 have been processed, then a state 65 is entered in which the inclusion bits are cleared. A state 66 is then entered in which other operations associated with the power-down function may be executed.

It can now be understood how several advantages are obtained with this arrangement. In particular, it can now be seen that during a power management function, a cache memory 26 can be flushed without necessarily examining all individual dirty bits 35 in the cache 26. Indeed, the need to check all dirty bits 35 is greatly diminished such that only the cache lines 37 which have actually been accessed need to be checked for cache dirty state. This is accomplished by a cache controller 24 and process whereby whenever data is fetched into a cache line 37, an inclusion bit 39 for the associated entire block 40 in which the cache line 37 resides is set. Therefore, when it is time to flush the cache 26 during a power management operation, the power management software need only flush those blocks 40 of the cache 26 where the inclusion bit 39 has been set.

Equivalents

While this invention has been particularly shown and described with references to preferred embodiments thereof, it will be understood by those skilled in the art that various changes in form and details may be made therein without departing from the spirit and scope of the invention as defined by the appended claims. For example, the main memory 14 storage kept active during the power management cycle may be a disk drive and cache flushing therefor occurs to the disk in a similar fashion. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. A cache system comprising:
   a cache memory, the cache memory arranged in blocks of cache lines, with each such block including a plurality of cache lines;
   wherein the cache memory additionally comprises:
      a plurality of valid bits, with a valid bit associated with each cache line, the valid bit indicating whether the data in the associated cache line is active;
      a plurality of dirty bits, with a dirty bit associated with each of the cache lines, the dirty bit indicating whether the data in the associated cache line has been rewritten;
   a flush inclusion map, the flush inclusion map having a corresponding block flush inclusion bit for each block of cache lines, and
   wherein the block flush inclusion bit for a given block is set whenever any of the valid bits in the block is set; and
   a cache flush controller, connected to control a cache flush operation, the cache flush controller reading the state of the block flush inclusion bits, and executing a cache flush operation only for blocks in which the associated block flush inclusion bit is set, and while executing the cache flush operation, the cache flush controller reading the state of the dirty bits in the associated block to determine individual cache lines to be flushed, such that the only dirty bits read during the cache flush operation are those dirty bits associated with the cache lines in those blocks for which the corresponding block flush inclusion bit is set.

2. A cache system as in claim 1 wherein the flush inclusion map is stored in the cache flush controller.

3. A cache system as in claim 1 wherein the cache flush controller is implemented as a software program in a processing unit.

4. A cache system as in claim 1 wherein the cache flush controller is implemented in a cache controller logic circuit.

5. A process for flashing data in a cache memory to a main storage unit during a power management sequence executed for a data processing system, the process comprising the steps of:
   setting a block flush inclusion bit whenever data is copied from the main storage unit into a cache location within a corresponding block of cache locations;
   setting a dirty bit for a cache location when that cache location is written with a data value different from a data value in an associated main storage unit location;
   during a cache flushing operation, reading the block flash inclusion bit, and if the block flush inclusion bit is set, determining whether individual cache lines in the associated block arc to be written to the main storage unit; and wherein the step of reading the block flush inclusion bit further comprises the step of reading the state of all of the dirty bits in the associated block and writing only the cache lines for which the dirty bit is sot back to the main storage unit.

6. A process as in claim 5 wherein the power management sequence is executed upon a power-down operation of the data processing system.

7. A process as in claim 5, additionally comprising the step of:

during a block cache write-to-main-storage operation, clearing the state of the block flush inclusion bit for the associated block.

8. A data processing system comprising:

a central processing unit (CPU);

a main memory, connected the CPU to permit the CPU to read and write data to locations in the memory;

a cache memory, connected to the CPU and the main memory, the cache memory arranged in a plurality of blocks, with each block itself including a block flush inclusion bit and a plurality of cache storage locations, with each cache location including a valid bit associated with each cache line, the valid bit indicating whether the data in the associated cache line is active, and wherein the block flush inclusion bit for a given block is set whenever any of the valid bits in the block is set; and a cache controller, connected to the CPU, the main memory, and the cache memory, the cache controller permitting cache memory operations such that the cache locations mirror the contents of the main memory in a manner which is transparent to the CPU, and the cache controller also reading the state of a block flush inclusion bit, the cache controller performing a cache flushing operation to cause the contents of cache storage locations ill a block to be written to the main memory only if the corresponding block flush inclusion bit is set.

* * * * *

UNITED STATES PATENT AND TRADEMARK OFFICE
CERTIFICATE OF CORRECTION

PATENT NO. : 6,205,521 B1
DATED : March 20, 2001
INVENTOR(S) : Reinhard C. Schumann It is certified that error appears in the above-identified patent and that said Letters Patent is hereby corrected as shown below:

Column 8,
Line 16, replace "ill" with -- in --.

Signed and Sealed this

Sixth Day of November, 2001

Attest:

*Nicholas P. Godici*

NICHOLAS P. GODICI
*Attesting Officer*   *Acting Director of the United States Patent and Trademark Office*